(12) United States Patent
Nakamura

(10) Patent No.: US 8,994,662 B2
(45) Date of Patent: Mar. 31, 2015

(54) METHOD OF GRAPHIC ILLUMINATION

(75) Inventor: Fusanobu Nakamura, Kanagawa-Ken (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 187 days.

(21) Appl. No.: 13/313,667

(22) Filed: Dec. 7, 2011

(65) Prior Publication Data
US 2013/0147715 A1     Jun. 13, 2013

(51) Int. Cl.
*G06F 3/02* (2006.01)
*G06F 1/16* (2006.01)

(52) U.S. Cl.
CPC .......... *G06F 1/1601* (2013.01); *G06F 3/0219* (2013.01); *G06F 3/02* (2013.01)
USPC ............. 345/168; 361/679.02; 362/97.2; 362/97.1

(58) Field of Classification Search
None
See application file for complete search history.

(56) References Cited

U.S. PATENT DOCUMENTS

| | | | |
|---|---|---|---|
| 5,818,357 A * | 10/1998 | Motoyama et al. | 341/20 |
| 6,762,740 B1 * | 7/2004 | Kimura | 345/102 |
| 7,778,015 B2 | 8/2010 | Weber et al. | |
| 7,880,131 B2 | 2/2011 | Andre et al. | |
| 7,884,315 B2 | 2/2011 | Andre et al. | |
| 7,960,684 B2 | 6/2011 | Payne | |
| 8,390,481 B2 * | 3/2013 | Pance et al. | 341/33 |
| 2004/0074862 A1 * | 4/2004 | Musaragno | 215/308 |
| 2006/0012949 A1 * | 1/2006 | Hutchinson et al. | 361/679 |
| 2010/0008030 A1 * | 1/2010 | Weber et al. | 361/679.02 |
| 2012/0092816 A1 * | 4/2012 | Moran et al. | 361/679.01 |

FOREIGN PATENT DOCUMENTS

| | | | | |
|---|---|---|---|---|
| JP | 59103232 A * | 6/1984 | | H01H 13/02 |
| JP | 2000-94872 | 4/2000 | | |
| JP | 2003-11558 | 1/2003 | | |

* cited by examiner

*Primary Examiner* — Jason Olson
(74) *Attorney, Agent, or Firm* — Shimokaji IP

(57) ABSTRACT

A computer system, a display system, a method of graphic illumination is provided to give a user an improved appearance, functionality, and aesthetics. A display system may comprise a housing, a light source, and a plurality of micro perforations. The housing may have an interior surface and an exterior surface. The light source may be located within the housing. The plurality of micro perforations may be disposed to extend from the interior surface to the exterior surface of the housing. The plurality of micro perforations may pass through the housing at different angles with respect to a plane of the exterior surface of the housing.

11 Claims, 5 Drawing Sheets

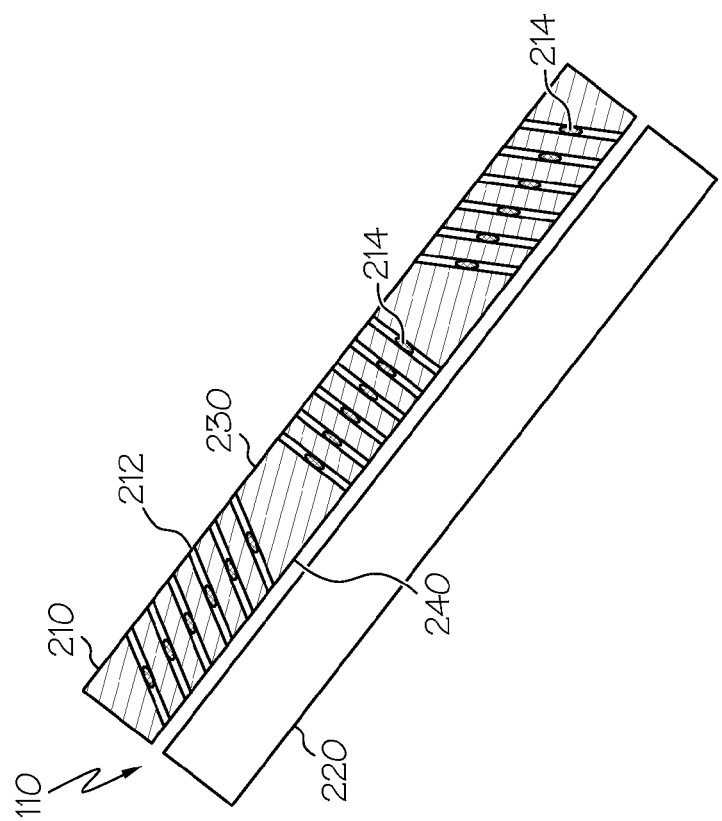
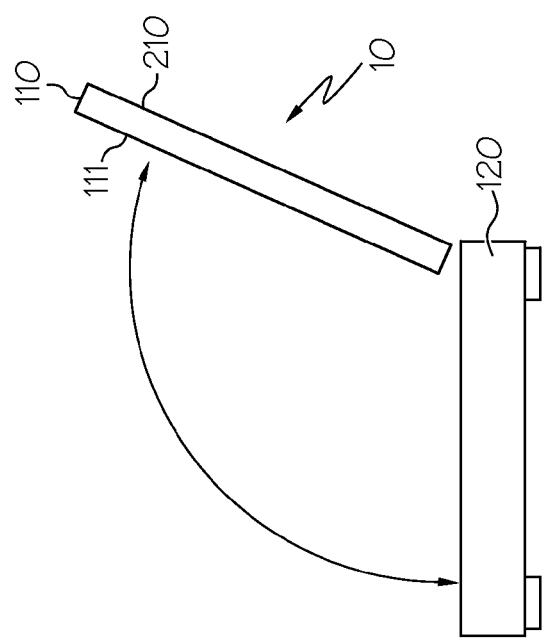
FIG. 2B
FIG. 2A

METHOD OF GRAPHIC ILLUMINATION

BACKGROUND OF THE INVENTION

The present invention relates generally to display systems and, more specifically, to light-transmissive display systems that become visible when illuminated.

In the world of consumer electronic devices, there has been an ever-present demand for improved appearance, improved functionality, and improved aesthetics. Industrial design has become a highly skilled profession that focuses on fulfilling this need for enhanced consumer product appearance, functionality, and aesthetics.

Much of the aesthetic appeal of an electronic device or other consumer product may quickly be compromised if there are too many display elements, lights, and indicators, or if too much of the visible display area is occupied by display elements that are not needed or relevant at all times. When not needed, these "passive" or inactivated visual display elements may remain perceptible to the user, even though in the "off" state. This is not only displeasing from an aesthetic standpoint, but it can be an annoying distraction that interferes with the perception and understanding of other visual display elements that are of greater importance or should be observed at a given moment.

Therefore, it can be seen that there is a need to present displays, lights, and other visual indicators for a user in a manner that is readily understandable, yet uncluttered and aesthetically pleasing.

SUMMARY

In one aspect, a display system comprises a housing having an interior surface and an exterior surface; a light source located within the housing; and a plurality of micro perforations disposed to extend from the interior surface to the exterior surface of the housing, wherein the plurality of micro perforations pass through the housing at different angles with respect to a plane of the exterior surface of the housing.

In another aspect, an electronic computing apparatus comprises a plurality of micro perforations disposed to extend from an interior surface to an exterior surface of a housing of the electronic computing device, the plurality of micro perforations including at least a first set of micro perforations disposed at a first angle relative to an external plane of the housing, and a second set of micro perforations disposed at a second angle relative to the external plane of the housing.

In a further aspect, a mobile computing device comprises a computing device capable of receiving, processing, and outputting data; a plurality of keys having a key top coupled to the computing device and configured to generate touching signals; a plurality of micro perforations disposed to extend from an interior surface to an exterior surface of a key top on the keys; and a light source under each of the plurality of the key tops.

These and other features, aspects and advantages of the present invention will become better understood with reference to the following drawings, description and claims.

BRIEF DESCRIPTION OF THE DRAWINGS

FIG. 2A is a side view of a notebook personal computer according to the exemplary embodiment of FIG. 1A;

FIG. 2B is a cross sectional view of a back cover of the upper housing at one angle with a lower housing of FIG. 1A;

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments comprise an aesthetically pleasing visual display that may be backlit. More specifically, exemplary embodiments may provide visual displays that may include a micro perforated and backlit display having alternative display capabilities. Such displays may be used on electronic or other personal devices. A plurality of micro perforations may be arranged into an overall pattern. Each micro perforation may have a diameter of about 100 microns or less, which is not visible unless seen very closely. In some embodiments, a first set of micro perforations may be cut at a first angle through a back cover of a lid of a laptop computer, for example, and a second set of micro perforations may be cut at a second angle through the back cover. When a user opens the lid, a logo pattern at the back cover of the lid may change as light passing through the first set of micro perforations that may be visible at a first angle of the lid and light passing through the second set of micro perforations that may be visible at a second angle of the lid. In some embodiments, a plurality of micro perforations may be formed through a key top of a keyboard.

Figure 1B:
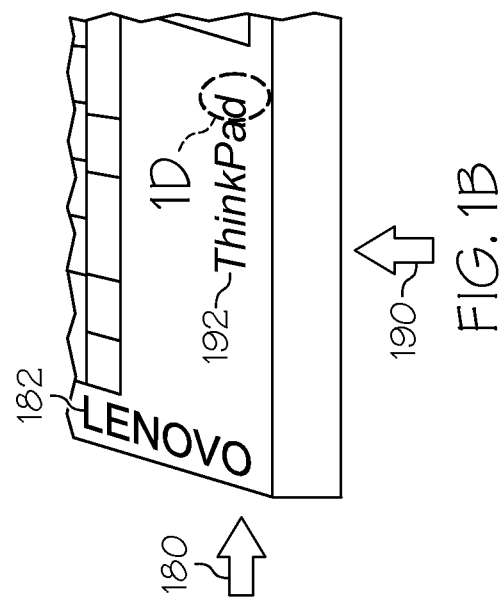
FIG. 1B is a close up view of a front cover of the notebook personal computer according to the exemplary embodiment shown in FIG. 1A.
Figure 1A:
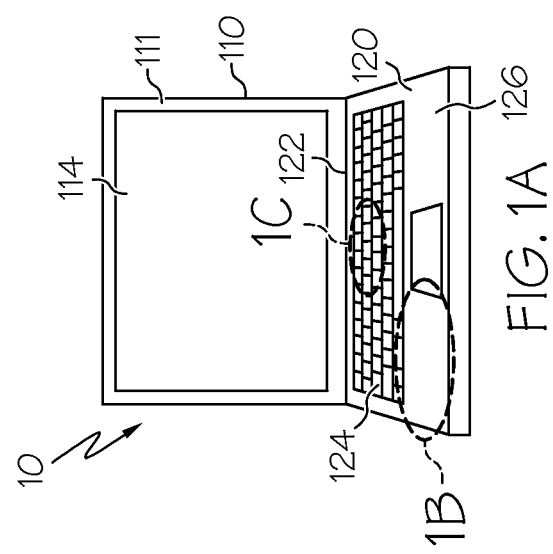
FIG. 1A is a front view of a notebook personal computer according to an exemplary embodiment.
Figure 1D:
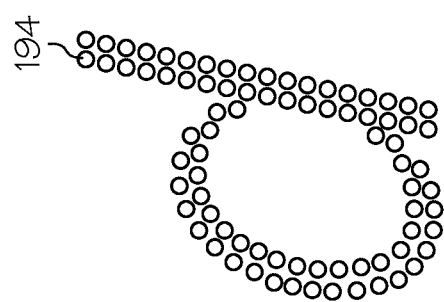
FIG. 1D is a close up view of a plurality of micro perforations on the front cover of the notebook personal computer according to the exemplary embodiment shown in FIG. 1A.

Referring to FIG. 1A, a notebook PC 10 may comprise an upper housing 110, such as a display unit, and a lower housing 120, such as a system unit, for example. The upper housing 110 and the lower housing 120 may be connected via a linking member 122, such as a hinge member. The notebook PC 10 may be a laptop computer system, such as one of the ThinkPad® series of personal computers sold by Lenovo (US) Inc. of Morrisville, N.C., or a workstation computer, such as the ThinkStation®, which is sold by Lenovo (US) Inc. of Morrisville, N.C.

The notebook PC 10 may include a processor (not shown) within the lower housing 120. A liquid crystal display (LCD) 114, which may be a touch sensitive screen, for example, may be disposed on a front cover 111 of the upper housing 110. The liquid crystal display 114 may be coupled to be operable by the processor to display data to a user of the notebook PC 10.

The upper housing 110 and the lower housing 120 may move pivotally around the linking member 122. The upper housing 110 may be rotatable relative to the lower housing 120. The lower housing 120 may include a top cover 126 and an input device, such as a keyboard 124.

Referring to FIG. 1B, the top cover 126 may include a visual display, such as the Lenovo® logo 182 and ThinkPad® logo 192. Although the visual display is in the form of a logo, it will be readily appreciated that a wide variety of shapes, sizes, and types of visual displays may be used, and that such displays may be logos, trademarks, texts, advertisements, or other general types of patterns or displays. An exemplary embodiment may be used for visual displays on other items, such as, cell phones, smart phones, Global Positioning Systems (GPS), or electronic dictionaries, for example. In addition, an exemplary embodiment may also be used for visual displays on other items that may not be electronic devices, as will be readily appreciated, and all such other users are specifically contemplated.

The Lenovo® logo 182 and the ThinkPad® logo 192 may comprise a pattern of numerous micro perforations 194 formed in the material of the top cover 126. The Lenovo® logo 182 and the ThinkPad® logo 192 can be, for example, a micro perforated and backlit display having a different surface finish than the rest of top cover 126. The backlit display may be illuminated by a light source 220 (shown in FIG. 2B), such as light emitting diodes (LEDs), disposed within the lower housing 120, behind the micro perforations in the top cover 126.

In exemplary embodiments, micro perforations formed in the top cover 126 for such a display may be small enough so that they cannot be readily distinguished from the base material surface by the naked human eye, but are large enough so that light may pass therethrough and be seen by the naked human eye when such light is provided behind the micro perforations. In general, such micro perforations may extend from one side of the base material to another side, such that light may pass therethrough. Such micro perforations may be about 50 microns or less in diameter, and typically about 20 to 30 microns in diameter. It is thought that a diameter of about 30 microns or less tends to result in such micro perforations being "invisible" to the naked eye for most observers.

Such micro perforation patterns may be formed on a surface of an opaque base object where the subject visual display is desired. Although metallic surfaces are used frequently, such as, stainless steel, aluminum, titanium, copper, magnesium and the like, for example, other base objects that are readily amenable to the formation of such micro perforations may be used.

Micro perforations may be cut by lasers at slanted angles such that a user may see the Lenovo® logo 182, but not the ThinkPad® logo 192 from a first direction 180. In the same way, a user may see the ThinkPad® logo 192 but not the Lenovo® logo 182 from a second direction 190.

Figure 1C:
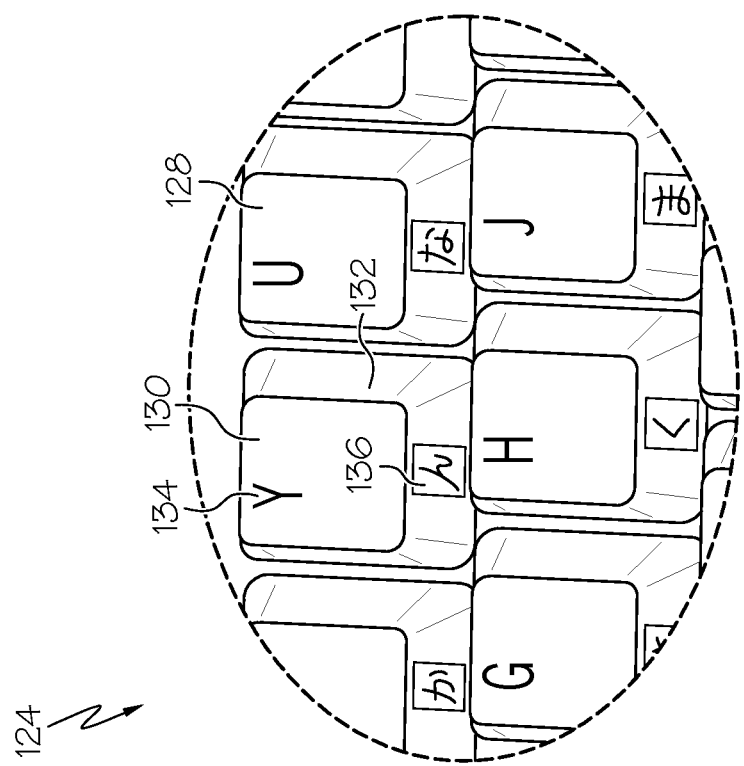
FIG. 1C is a close up view of a part of a keyboard of the notebook personal computer according to the exemplary embodiment shown in FIG. 1A.

Referring to FIG. 1C, the keyboard 124 may comprise a plurality of keys 128. Each of keys 128 may have a key top 130 and side walls 132. A plurality of the key tops 130 may be coupled to the notebook PC 10 to generate touching signals. An alphabet letter 134, such as "Y", may be formed by a pattern of micro perforations formed on the top cover 128.

Other characters, such as Japanese Hiragana or Katakana letters 136, such as "ん") may be formed by a pattern of micro perforations on the side walls 132 of the keys 128. Under the key top 130, there may exist a light source 220 (shown in FIG. 2B), such as light emitting diodes (LEDs), for example. The LEDs may be turned on by a user pushing a key or button on the keyboard 124, or on some other place on the notebook 10, to emit light rays through micro perforations so that users may see the Japanese Hiragana or Katakana letters when they want to input Japanese characters. In another exemplary embodiment, Japanese Hiragana or Katakana letters 136 may be disposed on the top cover 128 of the key top 130.

Referring to FIGS. 2A-2B, the upper housing 110 of the notebook PC 10 may further include a back cover 210 and a backlight 220 for the LCD 114. The back cover 210 may include an interior surface 240 and an exterior surface 230. The upper housing 110 may comprise a plurality of micro perforations 212 disposed to extend from the interior surface 240 to the exterior surface 230. The plurality of micro perforations 212 may be arranged into a plurality of patterns. The plurality of micro perforations 212 may be arranged at different angles with respect to the backlight 220 or a plane of the exterior surface 230 of the upper housing 110. In other words, a first set of micro perforations may be disposed at a first angle relative to the plane of the exterior surface and a second set of micro perforations may be disposed at a second angle relative to the plane of the exterior surface. A third set of micro perforations may be disposed at a third angle relative to the external plane of the housing. Therefore, when viewed from a first viewing angle, the user may see, for example, light passing through the first set of micro perforations. When viewed from a second viewing angle, the user may see, for example, light passing through the second set of micro perforations. When viewed from a third viewing angle, the user may see, for example, light passing through the third set of micro perforations.

At least a portion of the plurality of micro perforations 212 may include one or more various translucent particles, such as resins 214, for example. The resins 214 inside the micro perforations may be selected to have different optical characteristics such that, when the backlight 220 emits light rays through the resins inside each of micro perforations, users may see various colors of light rays coming out of the micro perforations.

Figure 2D:
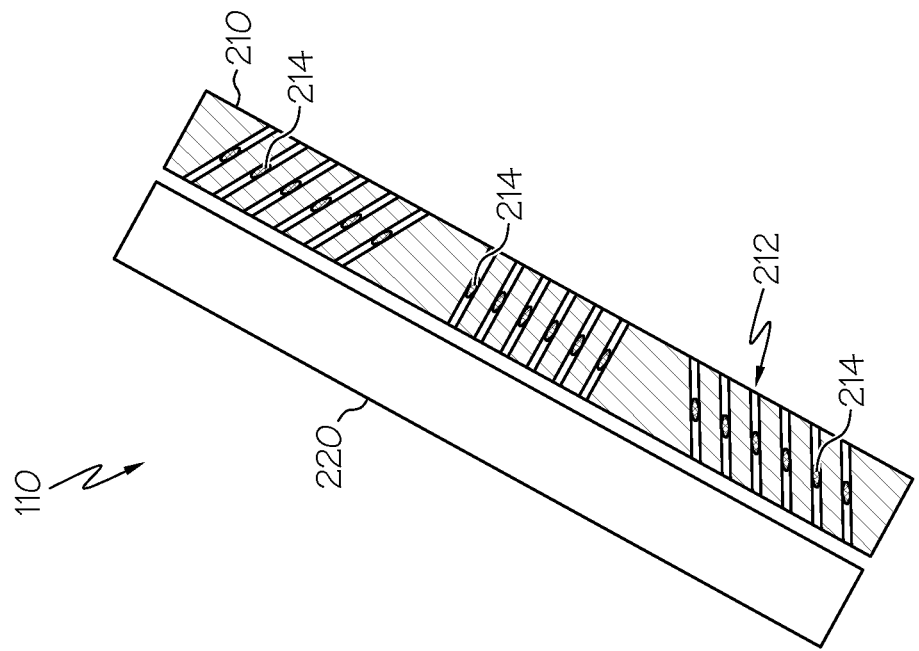
FIG. 2D is a cross sectional view of a back cover of the upper housing at yet another angle with a lower housing of FIG. 1A.
Figure 2C:
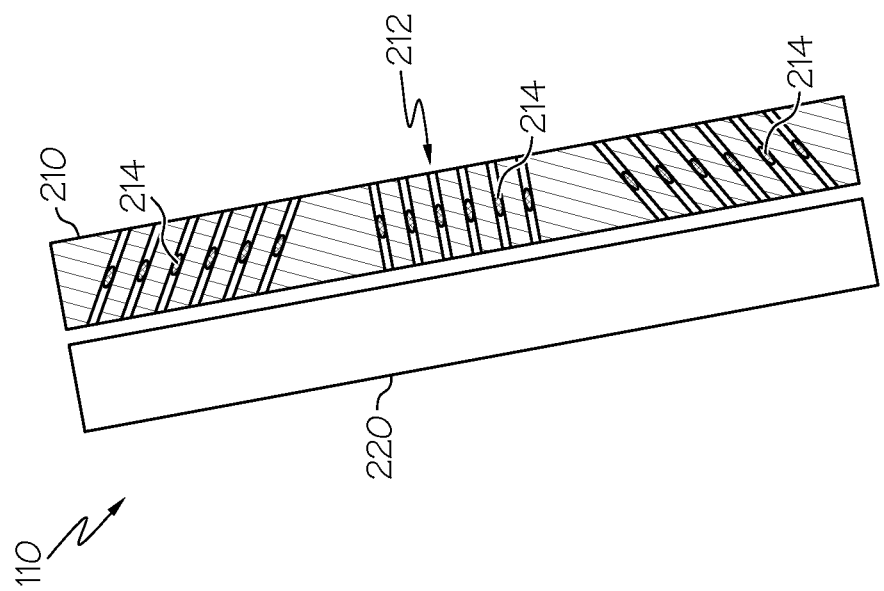
FIG. 2C is a cross sectional view of a back cover of the upper housing at another angle with a lower housing of FIG. 1A.

In operation of an exemplary embodiment, FIGS. 2B-2D show the upper housing 110 being opened at different angles comparable to the lower housing 120. A logo pattern 290 on the back cover 210 of the upper housing 110 may change in designs or colors when the user rotates the upper housing 110 relative to the lower housing 120.

Figure 2E:
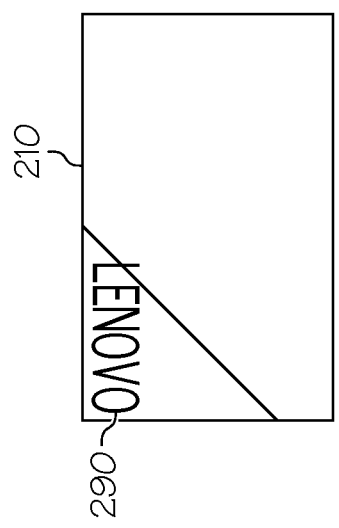
FIG. 2E is a plan view of an exterior surface of the back cover of the upper housing according to an exemplary embodiment of FIG. 1A.
Figure 2G:
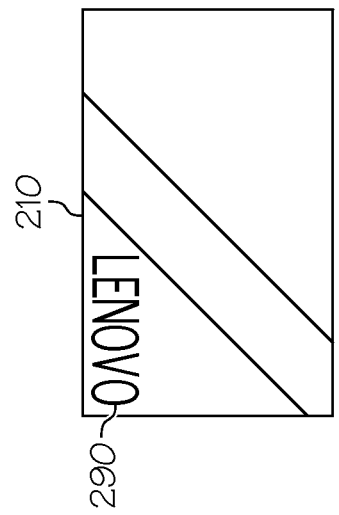
FIG. 2G is a plan view of an exterior surface of the back cover of the upper housing according to yet another exemplary embodiment.
Figure 2F:
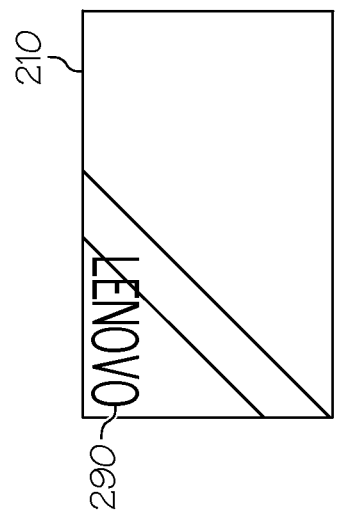
FIG. 2F is a plan view of an exterior surface of the back cover of the upper housing according to another exemplary embodiment.

Referring now to FIGS. 2E-2G, an exemplary animation effect provided across the back cover 210 is shown according to an exemplary embodiment of the present invention. A logo 290 may be positioned statically on the back cover 210. As the back cover 210 is viewed at different angles by the viewer (for example as described with reference to FIGS. 2B-2D), a graphic (for example a stripe) may first back light an area of the back cover 210 including the logo 290 (FIG. 2E). As the viewing angle changes, the backlighting may move the graphic over the logo 290 (FIG. 2F) and may appear to move across the back cover 210 until the graphic is no longer on the logo 290 (FIG. 2G).

Although the use of a micro perforated and backlit display is quite aesthetically pleasing to a user, there is typically no perceptible display or item when the light source is turned off. Although this may be preferable for some applications, it may be desirable for the backlit display item to be seen in some way even when the light source is turned off. For example, a logo or other trademark may be an item that a manufacturer might want on display at all times. Of course, a wide variety of other instances may also exist, such as advertisements, disclaimers, and other texts, for example. In such instances, it is desirable that the micro perforated and backlit display have alternative display capabilities when the backlight source is turned off. For example, the resins 214 inside the micro perforations may be replaced by fluorescent or phosphorescent dyes that may glow in the dark.

It should be understood, of course, that the foregoing relate to exemplary embodiments of the invention and that modifications may be made without departing from the spirit and scope of the invention as set forth in the following claims.

I claim:

1. A display system of a computer, comprising:
a computer housing including a lower housing having an input device and an upper housing having a liquid crystal display (LCD);
a linking member movably connecting the upper housing to the lower housing so that the upper housing rotates relative to the lower housing;
a light source located within the upper housing, wherein the light source is a backlight of the liquid crystal display;
a plurality of micro perforations disposed to extend from an interior surface to an exterior surface of a back cover of the upper housing so that the light source emits light through the plurality of micro perforations;
wherein the plurality of micro perforations are arranged in a plurality of sets of micro perforations;
wherein each set of micro perforations provides a different respective graphic pattern in the absence of the backlight reflecting off a separate reflecting material; and
wherein each set of micro perforations passes through the back cover of the housing at a respective different angle with respect to a plane of the exterior surface of the back cover;
wherein one graphic pattern is displayed to a user and another graphic pattern is undisplayed to the user as the upper housing rotates relative to the lower housing of the computer.

2. The display system of claim 1, wherein each of the plurality of micro perforations has a diameter of about 50 microns or less.

3. The display system of claim 1, wherein the each of the plurality of micro perforations has a diameter of about 20 to 30 microns.

4. The display system of claim 1, wherein the plurality of micro perforations comprise a first set of micro perforations at a first angle relative to the plane of the exterior surface of the back cover of the upper housing and a second set of micro perforations at a second angle relative to the plane of the exterior surface of the back cover of the upper housing.

5. An electronic computing apparatus, comprising:
a lower housing;
an upper housing pivotally connected to the lower housing, wherein the upper housing is rotatable with respect to the lower housing, wherein the upper housing has a front cover and a back cover, wherein the front cover is adapted to have a screen;
a plurality of micro perforations disposed to extend from an interior surface to an exterior surface of the back cover of the upper housing of the electronic computing apparatus, the plurality of micro perforations including a first set of micro perforations disposed at a first angle relative to an external plane of the back cover of the upper housing, and a second set of micro perforations disposed at a second angle relative to the external plane of the back cover of the upper housing;
a back light source of the screen disposed to illuminate the first and second sets of micro perforations by emitting light therethrough,
the first set of micro perforations is disposed in a first position on the back cover of the upper housing to provide a first image in response to emission of light from the first set of micro perforations at a first viewing angle relative to a viewer,
the second set of micro perforations is disposed in a second position on the back cover of the upper housing to provide a second image different from the first image, wherein the difference is not in orientation of the images, wherein the second image is in response to emission of light from the second set of micro perforations at a second viewing angle relative to the viewer,
wherein the rotation of the upper housing relative to the lower housing changes a viewing from the first viewing angle to the second viewing angle, and
upon the change in viewing angle, the first image disappears from view and the second image appears in view.

6. The electronic computing apparatus of claim 5, wherein the plurality of micro perforations are arranged into a plurality of patterns.

7. The electronic computing apparatus of claim 5, wherein the plurality of micro perforations comprise a third set of micro perforations at a third angle relative to the external plane of the back cover of the upper housing.

8. The electronic computing apparatus of claim 5, wherein the screen is a liquid crystal display.

9. A mobile computing system, comprising:
a computing device capable of receiving, processing, and outputting data;
a plurality of keys having a key top including a top surface and side walls, the key top being coupled to the computing device and configured to generate touching signals, wherein the top surfaces of respective keys include a default indicia corresponding to operation of respective keys;
a plurality of micro perforations disposed to extend from an interior surface to the top surface and to an exterior surface of at least one side wall of the key tops of the keys, the micro perforations in the at least one side wall forming a pattern indicating an alternate indicia corresponding to operation of the at least one key top of the keys;
a plurality of translucent particles interspersed in at least a portion of the plurality of micro perforations, wherein each translucent particle fills and fully closes only a fraction of each micro perforation that extends from the interior surface to the exterior surface; and
a light source located under the plurality of key tops, the light source configured to back light the alternate indicia by emitting light through the plurality of micro perforations in response to an activation of an alternate mode of operation for the at least one key top of the keys.

10. The mobile computing system of claim 9, wherein the plurality of micro perforations have openings on the top surface and side walls.

11. The mobile computing system of claim 9, wherein the plurality of micro perforations are arranged into a plurality of patterns.

* * * * *